June 3, 1941.  C. G. STRANDLUND  2,243,989

DISK PLOW

Filed April 13, 1936  3 Sheets-Sheet 3

INVENTOR
Carl G. Strandlund,
BY
Brown, Jackson, Boettcher & Dienner
ATTORNEYS.

Patented June 3, 1941

2,243,989

UNITED STATES PATENT OFFICE 2,243,989

DISK PLOW

Carl G. Strandlund, Moline, Ill., assignor to Deere & Company, Moline, Ill., a corporation of Illinois Application April 13, 1936, Serial No. 74,082

19 Claims. (Cl. 97—102)

The present invention relates generally to agricultural implements and is particularly concerned with the provision of a new and improved tractor disk plow especially arranged for heavy duty work.

One of the principal objects of the present invention is the provision of means making it possible to maintain the depth of plowing substantially constant notwithstanding variations in soil conditions. Heretofore, when plowing in a field in which the soil conditions are not constant, it was difficult to maintain a constant depth of plowing. For example, when the disks strike a hard spot in the ground, the disks and the frame tend to rise, and if the ground is hard enough the frame may be raised up sufficiently to also raise the rear furrow wheel. The additional weight of the furrow wheel and associated parts, added to the weight of the frame, serves the useful purpose of resisting any further upward movement of the plow due to the ground resistance against the disks. Heretofore, the rear end construction of disk plows of this general type was such that, due to looseness in the several joints of the connecting members, arising by virtue of permissible manufacturing tolerances, which looseness increases with wear, the frame was free to rise an inch or more before such looseness was taken up and the weight of the rear wheel imposed on the frame. Thus, as a result of such looseness, the weight of the rear wheel was not effective to aid in maintaining uniform depth within the limits desired.

It is an object of the present invention to provide means for loading a substantial portion or all of the weight of the rear wheel and associated parts upon the plow frame immediately upon any tendency of the latter to be lifted. Thus, notwithstanding the presence of looseness in the connections between the rear wheel and the plow frame, a substantial portion or all of the weight of the rear wheel will be effective to counteract any tendency for the frame to rise the instant that such tendency occurs. Specifically, the present invention contemplates a construction in which a spring or the like is connected so as to exert a substantially continuous force against the rear wheel tending to swing the same upwardly into substantially the same position that it takes by virtue of the support of the frame on the wheel. While this spring may be adjusted to actually hold the wheel upwardly against the frame so that the entire weight of the rear wheel will be effective to resist any tendency of the plow frame to rise the instant it occurs, according to the principle of the present invention the spring is so constructed and arranged that 90% to 95% of the weight of the rear wheel and associated parts is imposed upon the frame, so that the wheel will still remain in contact with the furrow bottom in order to hold the plow against lateral swinging, even though the frame does actually tend to rise and a substantial portion of the weight of the wheel is being utilized to resist such upward movement of the frame. If the entire weight of the wheel were utilized for this latter purpose, the wheel obviously would leave the furrow bottom and thereafter would be ineffective to hold the plow against lateral swinging.

Another object of the present invention is the provision of a plow embodying means, such as a crank screw, for adjusting the operating position of one of the supporting wheels, in connection with biased means so constructed and arranged as to relieve the adjusting means of practically all of the stresses due to the support of the frame or a portion thereof on said wheel. In heavy duty plows, especially those provided with manual depth and other adjustments, the task of raising and lowering the frame or otherwise making such adjustments becomes difficult due to the weight of the parts that have to be moved relative to each other. For example, in the case of a plow of the above mentioned type in which the rear end is supported upon a crank axle mounted furrow wheel whose position is adjusted by a crank screw or the like, not only must a substantial portion of the weight of the plow be lifted in adjusting the position of the rear furrow wheel, but in addition the frictional load in the screw mechanism must also be overcome. According to the principles of the present invention, by the provision of biased means relieving the adjusting mechanism of a large portion of the frictional load, ordinarily imposed upon the adjusting mechanism by reason of the weight of the implement, the adjustment of the implement is made much easier. If desired, also, the biased means may be so constructed and arranged as to actually oppose the weight of the frame, or a substantial portion thereof, so as to further facilitate making the desired adjustment.

An additional object of the present invention is to combine the aforesaid spring or biased means mentioned above so that with a single spring, or its equivalent, the advantages of maintaining the connections tight, loading a substantial portion of the weight of the rear wheel and associated parts on the frame to counteract any tendency of the latter to rise, and relieving the adjusting mechanism of a substantial portion of the frictional and other stresses to which it is normally subjected, are secured. Furthermore, the present invention contemplates an arrangement in which the single spring means not only functions to obtain the above mentioned results, but the same spring means is also utilized as the main lifting spring of the plow, aiding and assisting the raising of the plow frame and soil engaging tools to their transport or lifted position.

These and other objects and advantages of the present invention will be apparent to those skilled in the art after a consideration of the following detail description of the preferred form of the present invention, taken in conjunction with the accompanying drawings.

In the drawings,

Figure 5 is a section on an enlarged scale taken along the line 5—5 of Figure 2.

Figure 1:
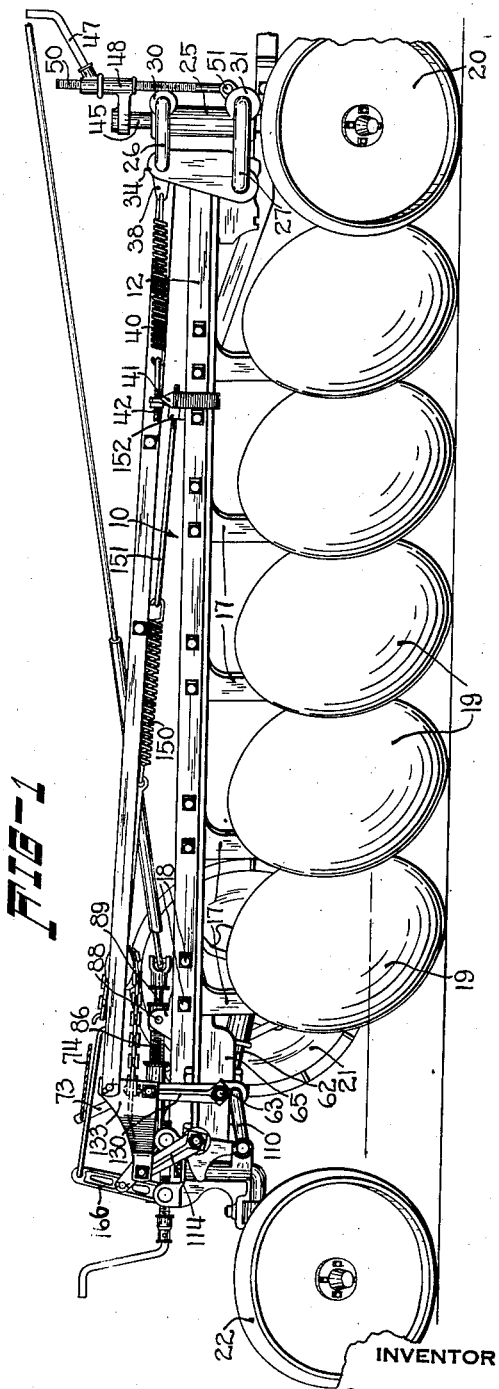
Figure 1 is a side view of a plow embodying the principles of the present invention, with the soil engaging tools in their lowered or working position.
Figure 2:
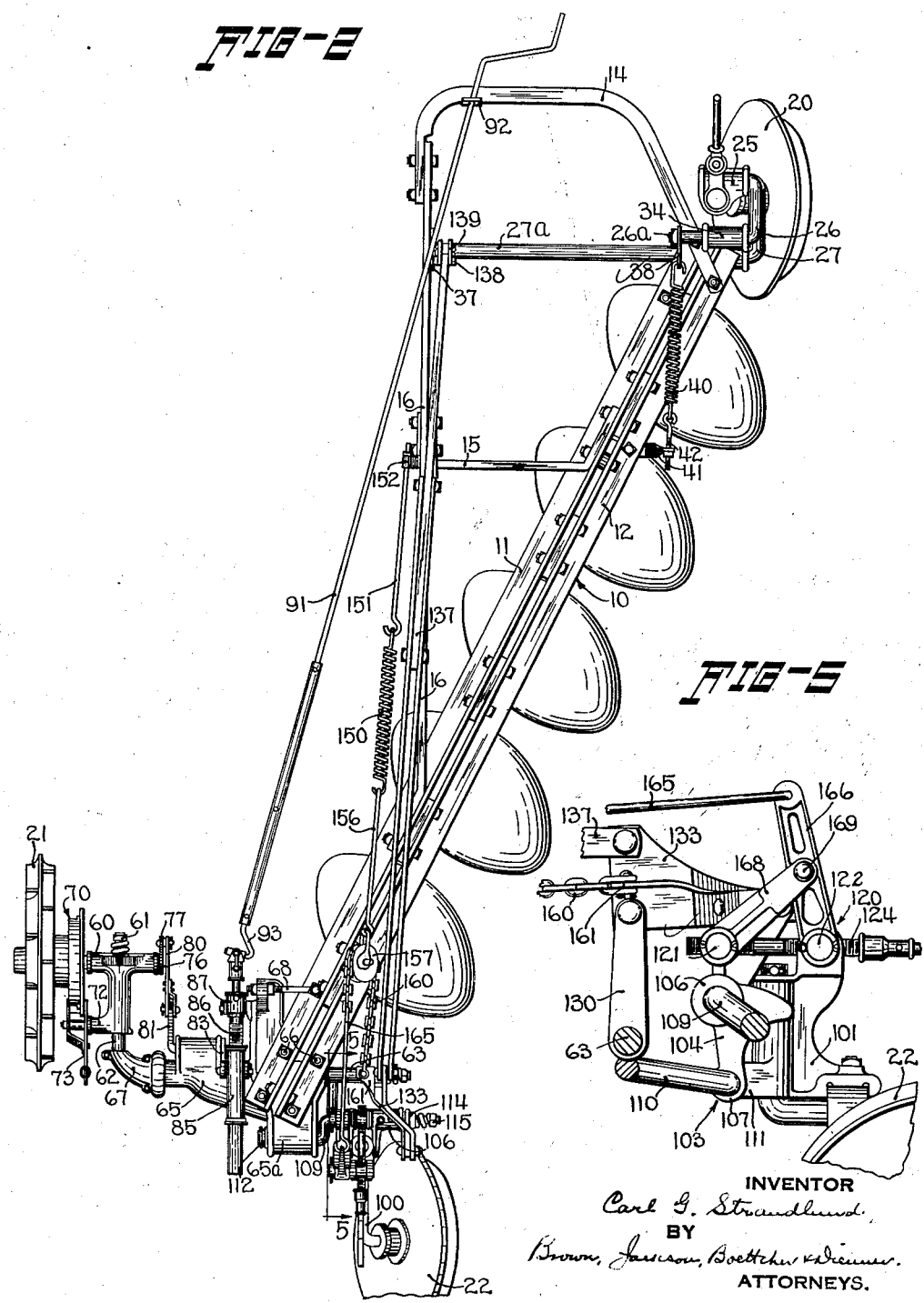
Figure 2 is a top view of the plow shown in Figure 1.

Referring now more particularly to Figures 1 and 2, the frame of the plow is indicated in its entirety by the numeral 10 and comprises two heavy angle bars 11 and 12 disposed in parallel relation generally longitudinally of the plow, a hitch bar 14 and suitable brace bars 15 and 16. The vertical legs of the frame bars 11 and 12 are spaced apart, as indicated in Figure 2, to receive the upper ends of a plurality of tool standards 17, the latter being rigidly fastened in position by means of bolts 18 or the like. Disks 19 or other soil engaging tools are mounted on the lower ends of the standards 17, as best shown in Figure 1.

The plow is carried upon a front furrow wheel 20, a land wheel 21 and a rear furrow wheel 22. The front furrow wheel 20 is supported for vertical movement relative to the plow in a front frame casting 25 which is connected to the front end of the frame bars 11 and 12 by a pair of swinging links or bails 26 and 27. The bails or links 26 and 27 have ends journaled, respectively, in suitable sleeve portions 30 and 31 forming a part of the front casting 25, and the bails 26 and 27 also have ends journaled in a casting 34 bolted to the front ends of the frame bars 11 and 12. The inner journaled end of the link or bail 27 is extended laterally, as at 27a (Figure 2), and is received for rocking movement in a bracket 37 fastened to the forward end of the brace bar 16. The inner journaled end of the upper bail 26 also has an extended end 26a to which an arm 38 is fixed, and a lifting spring 40 is hooked at its forward end to said arm and is adjustably anchored at its rear end to a frame bracket 41, as indicated at 42. The front furrow wheel 20 is journaled on the lower end of a vertical spindle 45 which is adjustably carried in the casting 25. A crank 47 is in engagement with a sleeve 48 fixed to the upper end of the spindle 45, the sleeve 48 receiving a screw 50 that is anchored at its lower end, as at 51, to the casting 25 and at its upper end receives the crank 47. By turning the latter in one direction or the other the position of the spindle 45 and the furrow wheel 20 relative to the casting 25 may be adjusted, and the position of the casting 25 relative to the frame 10 may be adjusted by swinging the lower link or bail 27, which will be referred to later.

The land wheel 21 is journaled on the spindle end of a bracket 60 secured, as by bolt means 61, to the outer end of a crank axle 62. The latter includes a shaft section 63 that extends to the opposite side of the plow (Figure 2) and by virtue of this construction the crank axle 62 has bearing support in a rear frame casting 65 that is suitably secured, as by bolts 66, to the rear ends of the frame bars 11 and 12, and the crank axle 62 is held in position preferably by a clamp casting 67. An adjusting bolt 68 (Figure 2) is fastened between the frame bar 11 and a bracket on the casting 65 for the purpose of cooperating with the bolts 66 in holding the casting 65 in proper position. Power lift clutch mechanism, indicated in its entirety by the reference numeral 70, is associated with the land wheel 21 so as to be driven thereby and is mounted on the spindle end of the bracket 60. The latter includes a section 72 upon which a power lift clutch trip lever 73 is pivoted. The latter is actuated by a rope 74 or the like (Figure 3) that is attached to the outer end of the trip lever 73 and extends forwardly to the tractor or other source of power. When the driving and driven elements of the clutch 70 are engaged, as by pulling forwardly on the trip lever 73, the forward rolling of the land wheel 21 is transmitted to a shaft 76 on the inner end of which an arm 77 is fixed (Figure 2). A thrust link 80 is connected between the arm 77 and an arm 81 that is mounted on or forms an integral part of an adjusting member, the inner end of which terminates in an arm 83 (Figure 2). The arm 83 carries a threaded sleeve 85 which receives a screw 86 the forward end of which is journaled for rotation in but held against axial movement with respect to a trunnion 87 pivoted, as at 88 (Figure 3), to a bracket 89 fastened to or forming a part of the frame casting 65. The screw 86 is rotated by means of a long crank 91 supported at its forward end on a bracket 92 on the hitch bar 14 and having its rear end 93 releasably hooked to a universal joint 94 secured to the forward end of the screw 86. Rotation of the crank 91 turns the screw 86 and rocks the arms 81 and 83, thus changing the abutment against which the thrust link 80 reacts when the power lift clutch is tripped to swing the rear land wheel crank axle 62.

The rear furrow wheel 22 is journaled for rotation on the rear end of a swinging crank axle 100 which, at its forward end, is bent upwardly and is capable of limited lateral swinging movement in the sleeve section 101 of a two-part wheel supporting member indicated in its entirety by the reference numeral 103. The other part of the member 103 consists of a supporting casting 104 which has upper and lower horizontal bearing portions 106 and 107 in which the adjacent laterally directed ends of oppositely mounted swinging link members or bails 109 and 110 are received. The two parts 101 and 104 are pivoted together by virtue of a pair of apertured lugs 111 which are carried on the sleeve section 101 and which receive the laterally outwardly directed section of the rear end of the lower bail 110. The rear portion of the upper bail 109 includes a spindle which is journaled for rocking movement in the rear end 65a (Figure 2) of the rear frame casting 65, and is held in place therein by a collar 112. The laterally outer portion of the opposite end of the bail member 109 includes a squared end which receives an arm 114 in nonrotatable relation, the arm being held on the laterally outer end of the bail 109 by a nut 115. The forward end of the lower swinging link or bail member also includes a spindle section which is journaled for rocking movement in a bearing boss 117 (Figure 3) formed on the frame casting 65 subtsantially directly underneath the portion of the frame casting 65 that receives the shaft end 63 of the land wheel crank axle 62. This type of support for the swinging crank axle of the rear furrow wheel is disclosed and claimed in my prior Patent No. 1,859,942, issued May 24, 1932, and as explained in my prior patent rocking the upper bail or link member by any suitable means serves to raise the frame relative to the rear furrow wheel from the working or operating position shown in Figure 1 to the inoperative or transport position shown in Figure 4.

The plow constructed according to the principles of the present invention differs from the construction shown in my prior patent in that, instead of having a single wheel supporting member connecting the rear furrow wheel crank axle with the oppositely mounted swinging links or bails, the two-part member 103 is provided, and suitable adjusting mechanism is connected between the two parts 101 and 104 thereof for the purpose of adjusting the vertical position of the rear furrow wheel with respect to the frame.

Referring now more particularly to Figure 5 in which the adjusting mechanism, indicated in its entirety by the reference numeral 120, is best shown, the upper end of the section 101 carries a trunnion member 122 and the upper end of the companion section 104 carries a similar trunnion member 121. The trunnions 121 and 122 have threaded openings which receive a screw threaded crank 124. Turning the crank member 124 in one direction separates the upper ends of the casting sections 101 and 104 so as to swing the rear furrow wheel 22 from its upper limit of adjustment, shown in full lines in Figure 3, to its lower position, shown in dotted lines. Turning the crank in the other direction moves the upper ends of the casting sections 101 and 104 toward each other.

Figure 3:
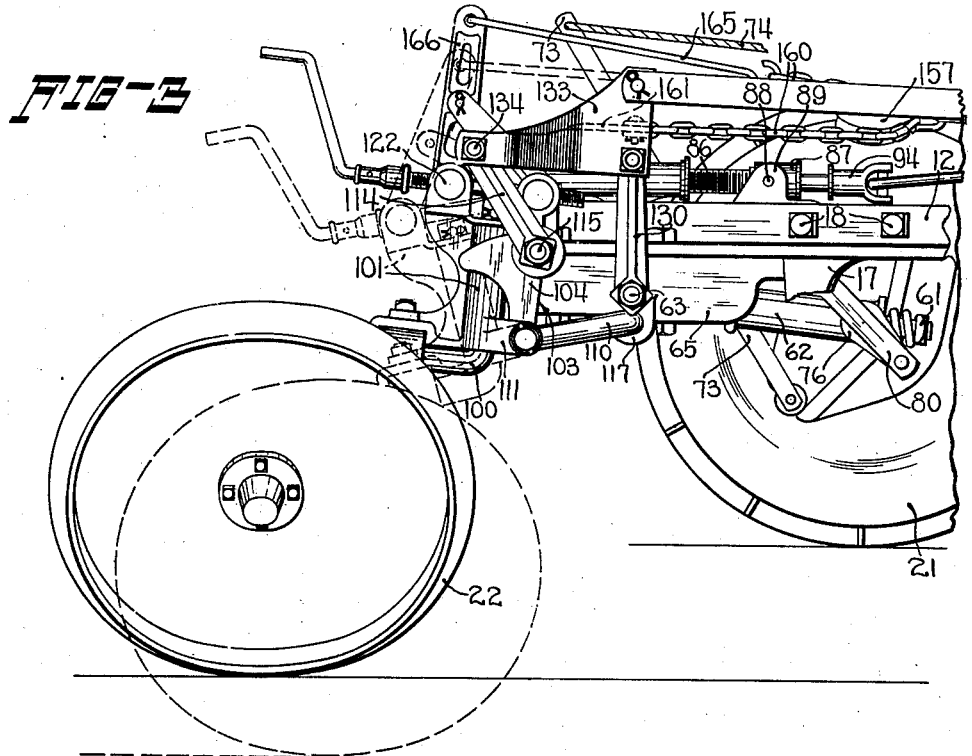
Figure 3 is an enlarged fragmentary side view, showing two adjusted operating positions of the rear furrow wheel.
Figure 4:
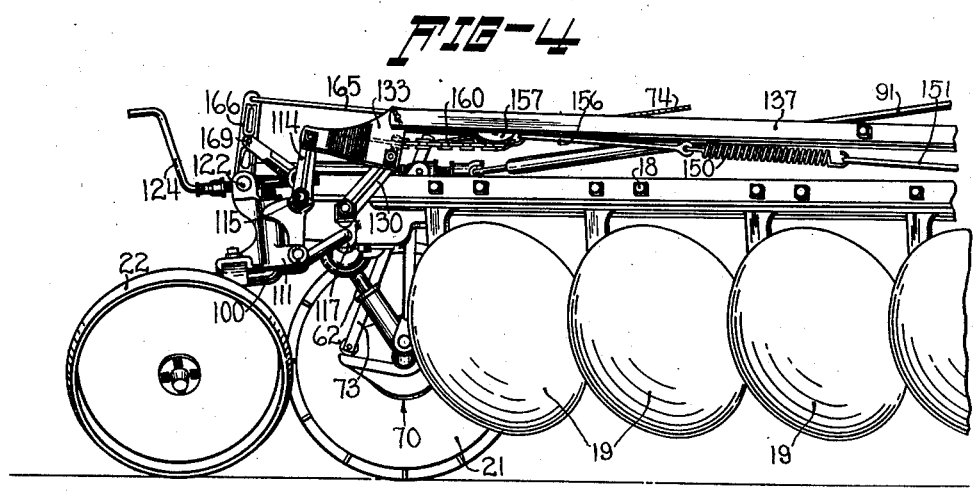
Figure 4 is a view of the rear end of the plow, similar to Figure 1, showing the soil engaging tools in their raised or transport position.

As mentioned above, the rear end of the plow is raised into its transport position by rocking the upper link or bail member 109, this being accomplished by swinging the arm 114 that is rigidly fastened to the right hand end of the bail 109. According to the principles of the present invention this is accomplished by virtue of the power lift mechanism indicated in its entirety by the reference numeral 70 and described above. When the power lift mechanism is engaged the forward rolling of the land wheel 21 reacts against the abutment arm 81 so as to cause the downward swinging of the land wheel crank axle 62, the opposite end 63 of which extends to the other side of the plow. An arm 130 is fixed to the end 63 of the crank axle 62 as by a nut 131, and the arm 130 extends upwardly and is pivotally connected to a link or plate 133 which at its rear end is pivotally connected, as at 134, to the upper end of the bail arm 114. Thus, as best shown in Figure 3, when the land wheel crank axle 62 is rocked downwardly, the arm 130 is swung in a clockwise direction and exerts a pull through link 133 against the arm 114, rocking the bail member 109 in a clockwise direction and exerting a downward and rearward thrust upon the upper end of the rear furrow wheel carrying member 103. Since this member is anchored at its lower end to the frame casting 65 by the link or bail 110, the rearward and downward movement of the upper end of the wheel carrying member 103 causes the rear end of the frame 10 to be raised into its transport position, shown in Figure 4. The front end of the frame is lifted at the same time, and to this end the link 133 is caused to exert a thrust on a longitudinally extending link 137 which at its forward end is pivoted, as at 138, to an arm 139 fixed to the left hand end of the bail shaft section 27a (Figure 2). Thus, whenever the power lift mechanism 70 is tripped and the land wheel crank axle 62 rocked downwardly, the forward rocking movement of the arm 130 acts to thrust the link 137 forwardly and to rock the bail 27 downwardly, thus lifting the front end of the frame relatively to the front furrow wheel 20, the front lifting spring 40 being tensioned to aid in raising the front end of the frame.

A lifting spring 150 is provided for not only assisting in raising the rear end of the frame but also to maintain the connecting links and associated parts between the rear furrow wheel 22 and the frame 10 tight and also to relieve the adjusting mechanism 120 (Figure 5) from at least the greater portion of the stress due to the support of the frame on the rear furrow wheel. The rear lifting spring 150 is anchored by means of a link 151 to a bracket 152 fastened to the frame 10 adjacent its forward end, as best shown in Figures 1 and 2. The rear end of the lifting spring 150 is hooked into the forward end of a link 156 which at its rear end carries a pulley 157. A chain 160 is trained around the pulley 157 and has one end anchored to a lug 161 formed on or secured to the connecting link member 133 adjacent its forward end, and the other end of the chain 160 is connected to the forward end of a link 165 which at its rear end is connected to the upper end of a toggle link 166 that is pivoted to the inner end of the rear trunnion 122. A second toggle link 168 is pivoted at 169 to the intermediate portion of the link 166 and at its other end is pivoted to the inner end of the forward trunnion 121, as best shown in Figure 5.

The lifting spring 150, according to the principles of the present invention, has a three-fold function. It assists in raising the rear end of the frame into its transport position, it relieves the adjusting mechanism of the weight of the frame, and it acts to load the principal portion, usually from 90% to 95%, of the weight of the rear furrow wheel 22 and associated parts onto the frame 10 the instant the latter tends to rise above its normal working position, as when the disks 19 encounter hard ground In the first place, it will be noted that when the frame is raised from its operating position (Figure 1) into its transport position (Figure 4) the position of the upper end of the toggle link 166 longitudinally of the plow does not vary to any material extent. However, by virtue of the forward swinging of the arm 130, the link 133 moves from its rearward position shown in Figure 1 to its forward position shown in Figure 4. Since the lifting spring 150 is connected by means of the chain 160 to both the connecting link 133 and the toggle link 166, the chain 160 thereby serves as an equalizing member, and since the end of the chain 160 that is connected with the toggle link 166 is not appreciably varied by the raising and lowering of the frame, all of the bias of the spring 150 is capable of acting against the link 133 to aid in moving the same forwardly, thereby making it much easier for the lifting mechanism to raise the plow.

Whether in raised or lowered position, by virtue of the equalizing chain connection 160, the tension of the spring 150 acts at all times against the toggle links 166 and 168. The effort of the spring 150 is, therefore, to spread the upper ends of the casting sections 101 and 104. It will be noted that this is in a direction opposite to the relative movement between these parts that the support of the frame on the rear furrow wheel 22 tends to cause. The spring 150, therefore, opposes the principal portion of the stresses to which the adjusting mechanism 120 would otherwise be subjected to when the weight of the frame is carried on the supporting wheel 22, and preferably the spring 150 will be tightened sufficiently to sustain practically all of the weight of the frame so that little effort would be required to turn the crank 124 to position the rear furrow wheel 22 in various adjusted operating positions.

Since relative movement between the casting sections 101 and 104, whether due to the support of the frame on the furrow wheel 22 or the effort of the spring 150 acting to separate the sections 101 and 104, is restrained by the threaded connection of the screw crank 124 with the trunnions 121 and 122, the effort of the spring 150 against the upper end of the toggle link 166 acts against the wheel carrying member 103 and tends to swing the same as a unit about the bearing portion 106 to take up the slack in the connections with the links 109 and 110, thereby tending to hold the wheel 22 and the member 103 upwardly in the same position relative to the frame that they are held when the weight of the frame bears on the wheel. In other words, by virtue of the spring 150, all of the connections between the wheel 22 and the plow frame are tightened in the same direction that they are tightened by the support of the frame on the wheel. Therefore, should the disks 19 encounter hard ground and force the frame 10 upwardly, by virtue of the spring 150 holding the wheel 22 upwardly, the weight of the latter is instantly available and is loaded onto the frame 10 when the latter begins to be raised. In prior constructions sometimes the frame would be raised an inch or more before the connections between the rear furrow wheel and the frame would be tightened. This action of the spring 150, in tending to spread apart the casting sections 101 and 104 and, at the same time, in tending to swing the wheel supporting unit 103 in a clockwise direction as viewed in Figure 3, is not affected by the availability of the spring 150 to assist in raising the frame relative to the ground wheel whenever the power lift 70 is actuated, and the spring 150 possesses this dual function because of the equalizing connection, namely, the pulley or sheave 157, between the intermediate portion of the link assembly 160, 165, the ends of which are connected, respectively, to the link 133 and the arm 166. In this way, the force of this spring 150 is divided so that one portion is available at all times to maintain the connections between the rear furrow wheel 22 and the plow frame tightened in the same direction that they are tightened by the weight of the frame while the other portion of the force of the spring is available to assist the forward swinging of the arm 130 from the position shown in Figure 3 to the position shown in Figure 4. The portion on the force of this spring 150 that acts at all times against the arm 166 and which tends to swing the furrow wheel supporting means in a clockwise direction as viewed in these figures is also effective to spread the casting sections 101 and 104 apart and relieve the adjusting crank 124 and associated parts of the major portion of the frictional load thereon.

While I have shown and described above the preferred form of my invention, it will be apparent to those skilled in the art that the present invention is not to be limited to the particular details shown and described above, but that, in fact, widely different means may be employed in the practice of the broader aspects of my invention.

What I claim, therefore, and desire to secure by Letters Patent is:

1. A plow comprising a frame, soil engaging tool means carried thereby, generally vertically movable supporting wheel means for one end of said frame, connections between said frame and said wheel means, means acting through said connections for moving said tool means into and out of inoperative position and including a part movable in one direction relative to said frame, said supporting wheel means including a part movable in a direction generally at right angles to said first named direction when said frame is raised and lowered, and spring means connected with said parts and reacting against said frame for assisting in lifting the latter and also loading at least a substantial portion of the weight of said supporting wheel means on said frame.

2. A plow comprising a generally longitudinally extending frame, rear supporting wheel means therefor comprising a swingable crank axle having a wheel journaled on the rear end thereof, a pair of oppositely disposed links, one connected at its rear end to said swingable crank axle and the other connected at its forward end to the swingable crank axle, means pivoting the opposite ends of said links to said frame, and spring means biased between the upper portion of said swingable crank axle and said frame tending to swing the crank axle relative to the frame in the same direction that the weight of the latter tends to hold said crank axle, whereby at least a portion of the weight of said wheel and swingable crank axle is imposed on the frame when the latter tends to rise.

3. A plow comprising a frame, soil engaging tool means carried thereby, supporting wheel means for one end of said frame comprising a swingable crank axle and a ground engaging wheel journaled on the end thereof, means movably connecting said swingable crank axle with said frame including link means accommodating the swinging movement of said crank axle, and spring means biased between said crank axle and said frame and arranged to load at least a portion of the weight of the wheel and associated parts onto the plow frame when said soil engaging tool means tends to lift said frame.

4. A plow comprising a frame, soil engaging tool means carried thereby, supporting wheel means for one end of said frame, said supporting wheel means comprising a supporting member movably connected with said frame, a crank axle pivotally connected to said supporting member and a ground engaging wheel journaled on said crank axle, means for swinging said supporting member for raising and lowering said tool means, adjusting mechanism movably connecting said crank axle with said supporting member, and spring means connecting said crank axle and supporting member so as to relieve said adjusting means of a substantial portion of stress due to the weight of the frame on said ground engaging wheel.

5. A plow comprising a frame, soil engaging tool means carried thereby, supporting wheel means for one end of said frame, said supporting wheel means comprising a supporting member movably connected with said frame, a crank axle pivotally connected to said supporting member and a ground engaging wheel journaled on said crank axle, means for swinging said supporting member for raising and lowering said tool means, adjusting mechanism movably connecting said crank axle with said supporting member, and a single spring means connected with said crank axle and said supporting member so as to assist said raising and lowering means and relieve said adjusting means of the principal portion of the stress that occurs by virtue of the support of said frame on said ground engaging wheel.

6. A plow comprising a frame, supporting wheel means for one end of the frame including a crank axle, a wheel journaled on the rear end of the crank axle, swinging link connections extending between and movable relative to said crank axle and said frame, means acting against said connections for swinging said crank axle to raise and lower the frame, upwardly extending arm means connected to said swinging crank axle and adapted to act therethrough against said connections, and spring means reacting against said frame and acting through said arm means on said crank axle to maintain said connections tight and impose a substantial portion of the weight of said crank axle and wheel on said frame, said spring means also being connected to said raising and lowering means to aid in raising the frame relative to said wheel.

7. A plow comprising a frame having a rear frame casting, a land wheel crank axle journaled for generally vertically swinging movement in said casting, an arm carried at one end on said land wheel crank axle, a rear furrow wheel crank axle having a rearwardly extending portion, a rear furrow wheel journaled on said portion, swinging link means connecting said rear furrow wheel crank axle with the frame for generally vertically swinging movement relative thereto, means connecting said swinging link means with the arm on said land wheel crank axle so that rocking of the latter swings said furrow wheel crank axle generally vertically, power lift means for actuating said land wheel crank axle, an upwardly disposed arm connected with said furrow wheel crank axle, and spring means reacting against said frame and connected to said upwardly extending arm and said connecting means, whereby the bias of said spring means acts through said last mentioned connecting means to aid in raising the frame and through said upwardly disposed arm to impose at least a substantial portion of the weight of said rear furrow wheel and associated crank axle on said frame.

8. A plow comprising a frame, a swingably mounted crank axle, a wheel journaled on the end of said crank axle, a member mounted for swinging movement with respect to said frame, means pivotally connecting said crank axle with said member, depth adjusting means connected between said crank axle and said member for shifting the position of the crank axle relative to said member, raising and lowering means connected with said member for raising and lowering the frame relative to said wheel, and spring means biased to act against said crank axle and said member tending to move them in a direction opposite to the direction in which they tend to be moved by the weight of said frame.

9. A plow comprising a frame, a swingably mounted crank axle, a wheel journaled on the end of said crank axle, a member mounted for swinging movement with respect to said frame, means pivotally connecting said crank axle with said member, depth adjusting means connected between said crank axle and said member for shifting the position of the crank axle relative to said member, raising and lowering means connected with said member for raising and lowering the frame relative to said wheel, a pair of toggle links connected, respectively, to said crank axle and said member, and spring means connected to act between said frame and one of said toggle links tending to separate said crank axle and member so as to relieve said adjusting means of the principal portion of the stress due to the support of said frame on said wheel.

10. A plow comprising a frame, a swingably mounted crank axle, a wheel journaled on the end of said crank axle, a member mounted for swinging movement with respect to said frame, means pivotally connecting said crank axle with said member, depth adjusting means connected between said crank axle and said member for shifting the position of the crank axle relative to said member, raising and lowering means connected with said member for raising and lowering the frame relative to said wheel, a pair of toggle links connected, respectively, to said crank axle and said member, a spring anchored at one end to said frame, and an equalizing connection carried at the other end of said spring and connected to one of said toggle links and to said raising and lowering means, whereby said spring means acts to aid in raising the frame and also to separate said crank axle and said member so as to relieve said adjusting means of a substantial portion of the stress due to the support of said frame on said wheel.

11. A plow comprising a frame, a rear furrow wheel crank axle, a rear furrow wheel journaled thereon, a two-part supporting member for said crank axle, one of said parts being pivoted to the other, swinging link means pivotally connecting said other part to said frame, depth adjusting means comprising a screw threaded member for connecting the two parts of said crank axle supporting member in adjusting position, a pair of toggle links connected, respectively, to said two parts, raising and lowering means connected with said swinging link means, a spring anchored at one end to said frame and carrying a pulley at the other end, a flexible member trained around said pulley, and means connecting one end of said flexible member to one of said toggle links and the other end to said raising and lowering means, whereby said spring means aids in raising said frame relative to said furrow wheel and biases said toggle links so as to take up the slack in said connecting link means and associated parts and biases the two parts of said crank axle supporting member so as to relieve said threaded member of the principal portion of the stresses due to the support of the frame on said rear furrow wheel.

12. A plow comprising a frame, supporting wheel means for one end of said frame comprising a supporting member movably connected with said frame, a crank axle movably connected to said supporting member and a ground engaging wheel journaled on said crank axle, means for moving said supporting member for raising and lowering said frame, adjusting mechanism movably connecting said crank axle with said supporting member, and spring means connecting said crank axle and supporting member so as to relieve said adjusting means of a substantial portion of stress due to the weight of the frame on said ground engaging wheel.

13. A plow comprising a frame, supporting wheel means for one end of said frame comprising a supporting member movably connected with said frame, a crank axle movably connected to said supporting member and a ground engaging wheel journaled on said crank axle, means for shifting said supporting member for raising and lowering said frame, adjusting mechanism movably connecting said crank axle with said supporting member, and a single spring means connected with said crank axle and said supporting member so as to assist said raising and lowering means and relieve said adjusting means of the principal portion of the stress that occurs by virtue of the support of said frame on said ground engaging wheel.

14. A plow comprising a frame, a movably mounted wheel carrying member, a part carried by said frame, means movably connecting said member with said part, depth adjusting means connected between said part and said member for shifting the position of the wheel carrying member relative to said frame, and spring means biased to act against said part and said member so as to tend to move them in a direction opposite to the direction in which they tend to be moved by the weight of said frame.

15. A plow comprising a frame, a movably mounted wheel carrying member, a part carried by said frame, means movably connecting said member with said part, depth adjusting means connected between said part and said member, a pair of links pivotally connected together and pivoted, respectively, to said member and said part, one of said links serving as a lever and acting when swung in one direction to shift said part and member relative to one another, and spring means biased to act against said one link so as to tend to shift said part and member relative to one another in a direction opposite to the direction that they tend to be moved by the weight of the frame.

16. A plow comprising a frame, a crank axle, a wheel journaled on the end of said crank axle, a member to which said crank axle is movably connected, depth adjusting means connected between said crank axle and said member for shifting the position of the crank axle relative to said member, link means connecting said member with said frame for movement relative thereto, raising and lowering means connected with said member for raising and lowering the frame relative to said wheel, a pair of toggle links connected, respectively, to said crank axle and said member, a spring anchored at one end to said frame, and an equalizing connection carried at the other end of said spring and connected to one of said toggle links and to said raising and lowering means, whereby said spring means acts to aid in raising the frame and also to separate said crank axle and said member so as to relieve said adjusting means of a substantial portion of the stress due to the support of said frame on said wheel and to tighten said link means to take up the slack therein.

17. An agricultural implement comprising a frame, supporting wheel means, a part carried by said frame and to which said supporting wheel means is connected for relative movement, adjusting means connected with said part and said supporting wheel means for adjusting the position of the latter, and spring means also connected to said supporting wheel means and said part for relieving said adjusting means of at least a portion of the stresses due to the weight of the frame on said supporting wheel means.

18. A plow comprising a frame, supporting wheel means for one end of the frame including a movable crank axle, a wheel journaled on said crank axle, connections disposed between and movable relative to said crank axle and said frame to provide for generally vertical movement of the crank axle relative to said frame, upwardly extending arm means connected with said crank axle and adapted to act through the latter against said connections, and spring means reacting against said frame and connected to act against said arm means to maintain said connections tight and impose a substantial portion of the weight of said crank axle and wheel on said frame.

19. A plow comprising a frame, supporting wheel means for one end of the frame including a movable crank axle, a wheel journaled on said crank axle, connections disposed between and movable relative to said crank axle and said frame to provide for generally vertical movement of the crank axle relative to said frame, means acting against said connections for shifting said crank axle to raise and lower the frame, arm means connected with said crank axle and adapted to act through the latter against said connections, and spring means connected to act against said arm means and said raising and lowering means so as to impose a substantial portion of the weight of the crank axle and wheel on said frame and to exert a force to aid in raising the frame relative to said wheel whenever said raising and lowering means is actuated.

CARL G. STRANDLUND.